United States Patent
O'Sullivan et al.

(10) Patent No.: US 8,352,560 B2
(45) Date of Patent: Jan. 8, 2013

(54) CONTROLLING LOCATION AND TIME PREFERENCES FOR MESSAGES

(75) Inventors: Patrick J. O'Sullivan, Dublin (IE); Liam Harpur, Dublin (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 12/494,404

(22) Filed: Jun. 30, 2009

(65) Prior Publication Data

US 2010/0332602 A1 Dec. 30, 2010

(51) Int. Cl.
*G06F 15/16* (2006.01)

(52) U.S. Cl. ........................................... 709/206

(58) Field of Classification Search .......... 709/204–207; 713/154
See application file for complete search history.

(56) References Cited

U.S. PATENT DOCUMENTS

| | | | |
|---|---|---|---|
| 4,670,905 A | 6/1987 | Sandvos et al. | |
| 5,532,680 A | 7/1996 | Ousborne | |
| 6,239,719 B1 | 5/2001 | Hopkins | |
| 7,275,082 B2* | 9/2007 | Pang | 709/206 |
| 7,469,292 B2* | 12/2008 | Landsman et al. | 709/225 |
| 2002/0143885 A1* | 10/2002 | Ross, Jr. | 709/207 |
| 2004/0049462 A1* | 3/2004 | Wang | 705/50 |
| 2004/0054733 A1* | 3/2004 | Weeks | 709/206 |
| 2005/0044150 A1* | 2/2005 | Kaminsky et al. | 709/206 |
| 2005/0091326 A1* | 4/2005 | Wang et al. | 709/206 |
| 2007/0161382 A1* | 7/2007 | Melinger et al. | 455/456.1 |
| 2008/0005325 A1* | 1/2008 | Wynn et al. | 709/225 |
| 2009/0055491 A1* | 2/2009 | Agarwal et al. | 709/206 |
| 2010/0115033 A1* | 5/2010 | Geffner et al. | 709/206 |
| 2010/0257249 A1* | 10/2010 | May et al. | 709/206 |

* cited by examiner

*Primary Examiner* — Chirag R Patel
(74) *Attorney, Agent, or Firm* — Esther F. Queen; Moore & Van Allen PLLC

(57) ABSTRACT

A system and method for controlling preferences for messages that includes receiving a message from a sender to a recipient, determining if the message will be received by the recipient based on message policies for the recipient, and notifying the sender that the message will not be received by the recipient and when it will be received responsive to the determination that the message will not be received by the recipient.

15 Claims, 4 Drawing Sheets

CONTROLLING LOCATION AND TIME PREFERENCES FOR MESSAGES

BACKGROUND OF EMBODIMENTS OF THE INVENTION

The present invention is related to message reception, and more specifically to controlling location and time preferences for messages.

In today's collaborative world people are increasingly leading busy lives. The number of messages between people, such as emails, instant messages (IMs), etc. is steadily rising. This has created a demand to better manage the intrusion that email and instant messaging has brought. For example, a senior manager with many employees in a large organization may get interrupted with too many messages from employees inside his organization. The senior manager would like to limit the impact of these interruptions by not opening his email application or turning his cell phone off. However, high priority or other important emails or messages may be missed by taking this approach.

BRIEF SUMMARY OF EMBODIMENTS OF THE INVENTION

According to one aspect of the present invention, a method for controlling preferences for messages that includes receiving a message from a sender to a recipient, determining if the message will be received by the recipient based on message policies for the recipient, and notifying the sender that the message will not be received by the recipient and when it will be received responsive to the determination that the message will not be received by the recipient.

According to another aspect of the present invention, a computing device for controlling preferences for messages includes a network interface, the network interface being configured to receive and send messages, a storage device, the storage device containing message policies for a recipient, and a processor, the processor configured to determine if a message sent from a sender to a recipient will be received by the recipient based on the message policies for the recipient and notify the sender that the message will not be received by the recipient and when it will be received responsive to the determination that the message will not be received by the recipient.

According to a further aspect of the present invention, a computer program product comprising a computer readable storage medium having computer readable program code embodied therewith, the computer readable storage medium including computer readable program code configured to receive a message from a sender to a recipient, computer readable program code configured to determine if the message will be received by the recipient based on message policies for the recipient, and computer readable program code configured to notify the sender that the message will not be received by the recipient and when it will be received responsive to the determination that the message will not be received by the recipient.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
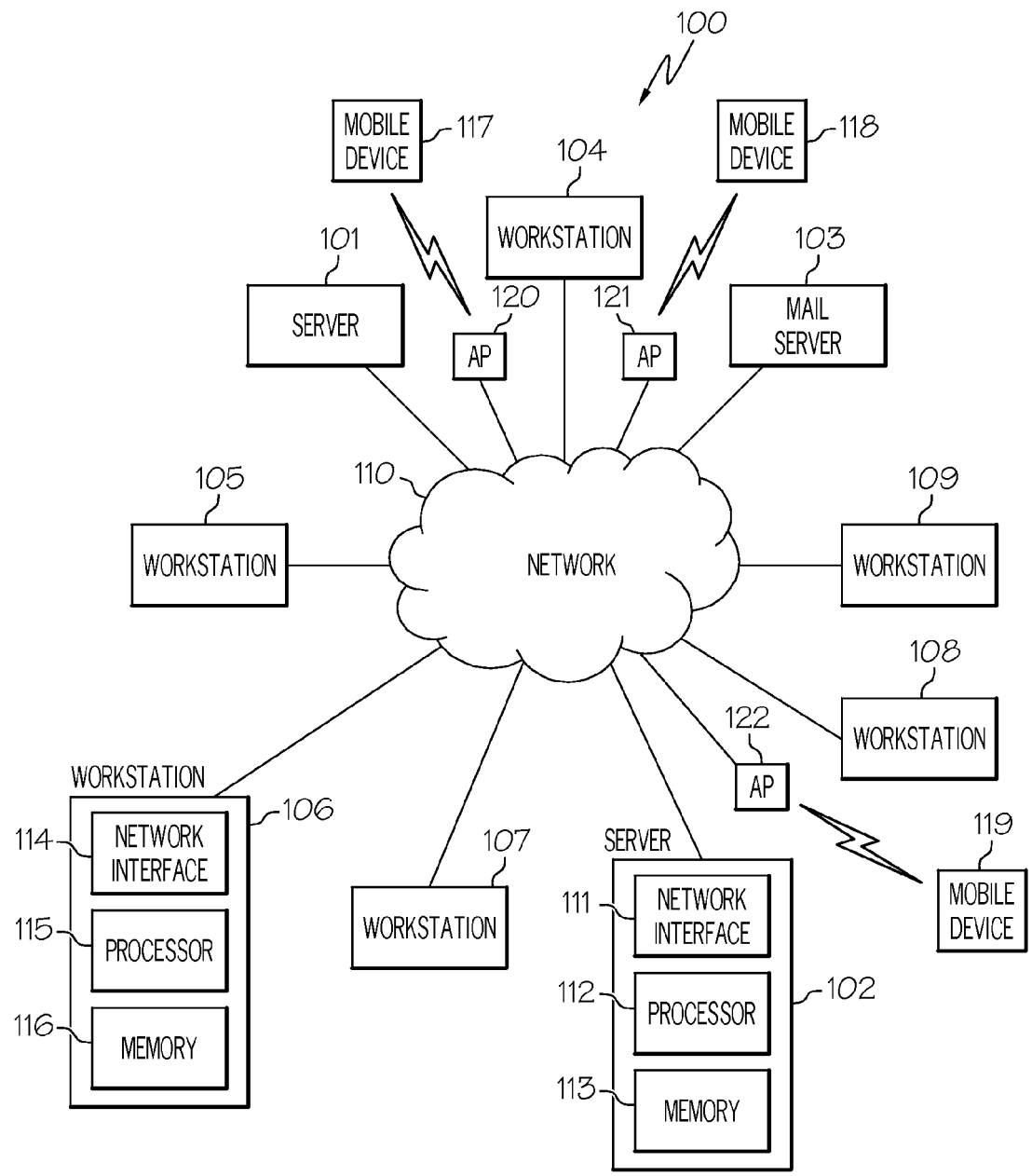
FIG. 1 is a system for controlling preferences for messages according to an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments according to the present invention allow users to better manager email, instant messages, and other messages according to a user's (recipient's) preferences (e.g., location, time, sender's characteristics, etc.). To help illustrate embodiments of the present invention, the term "message" will be used to represent any type of message such as, for example, email, instant message (IM), short message service (SMS), etc. According to embodiments of the present invention, a sender of a message may get a return notification that the sent message may be rejected or delayed because of location and time preferences that may have been set by the designated recipient of the message. For example, a message sent by a sender to a recipient may not be received until the recipient has changed location to his home office or until 11 a.m. when the recipient has specified that these messages will be accepted. A recipient may set up message policies for reception of messages such that messages (e.g., emails) related to work are only received while the recipient is in the office. However, once the recipient has arrived home, non-work related email/messages may be allowed to enter an inbox of the recipient.

Moreover, according to embodiments of the present invention, a user/recipient may specify that messages from all of his colleagues may be received by the user only between 9 a.m. and 5 p.m. but messages from a specific colleague or set of colleagues may be received by the user only between 2 p.m. and 3 p.m. According to embodiments of the present invention, a sender that sends a message to a recipient may get notification of differential location and time preference handling of messages to the recipient. For example, a sender may send messages to a recipient and the sender may be aware that the messages will not arrive until a later time. In this regard, based on message policies of the recipient, the messages may be buffered or stored, remotely or at the recipient's device, and then forwarded to the user during allowed message reception times.

Further, a sender of a message may orchestrate a response behavior pattern, e.g., only allowing recipients to respond within certain time intervals, at specific times, in specific locations, or a combination of these. In other embodiments according to the present invention, autonomic capabilities may exist such that behaviors are motivated when certain patterns and rules specified by the sender hold true. Embodiments according to the present invention provide the ability to deal with location situations which are generic and assigned locations and preferences when not clear. Decisions about location may be made on both the sender's and receiver's behalf.

Embodiments according to the present invention may be implemented in a variety of ways. For example, embodiments according to the present invention may be implemented using a centralized system where a user/business may configure their messaging systems to be enabled, not enabled, or in what circumstances to be enabled. For example, a business may configure their messaging activities to be enabled for messages for recipients who are on customer sites. In another example, these messages may be delayed until after 6 p.m. before being allowed to be received by the recipient. Further, a user/business may specify organizational and social network data sources to be used in determining whether messages are allowed to be received or not. In addition, a user when composing/sending a message may get notified of the preferences/rules that have been sent by the recipient of the message. The sender may explicitly get a message that sent message will not arrive at the recipient before a specific time and/or date. Additionally, the recipient may have options to set up a to-do or follow up reminder at a preferred time to remind the recipient to respond to messages that have been received but not responded to.

According to embodiments of the present invention, decision making and mail delivery activities may be controlled by a server. The server may include hardware and/or software to perform tasks that manage the decision making for when to send message items (i.e., submit mail to a delivery queue) to a recipient based on the recipient's message policies. Further, the server may be configured and have the capability of working with a mail application either on the server or on another processing device, to prompt when a delayed mailing situation will occur.

In still other embodiments of the present invention, profile preferences of a recipient regarding reception of mail and messages may be stored locally on a client system and mail queuing decision making handled on a server. The profile preferences (or message policies) stored locally on the client device may relate to the local user only or may be cached profiles of other mail recipients. All user interface interactions may be handled from the client (e.g., reporting when a message/mail item will be received by the recipient). Determining when to submit the mail/message delivery queue for the correct delivery time period may be handled by the server.

In another embodiment according to the present invention, a client device's messages/mail items may be stored/buffered locally (client device) or on a server. A client application at the client device may selectively display the message/mail items that meet the criteria of the current time period on a display of the client device.

Moreover, according to embodiments of the present invention, a business or corporation may set corporate wide message policy settings for all or certain groups of employees. For example, there may be corporate based policy settings around the length of time that message reception windows are set for certain groups of users. For example, a minimal amount of time a window is opened may be specified based on the targeted user population, or a maximum amount of time a window is open may be specified based on the targeted user population. A corporate message receipt policy setting may also be shared with subclasses of employees/users based on geographies, divisions, teams, projects, social networks, etc. Further, there may be a hierarchy specified for the decision making behind generation of the message policy settings if more than one class or subclass of message policies specifies a set of rules for a certain situation. The corporate and associated subclass settings may apply to one who sets them or who it applies to. For example, when an electronic message is sent to one or more users, message delivery rules may be applied as to the handling when more than one rule setting applies to the mail reception. For example, if Joe, a user, is receiving email that has been addressed to Mike, a manager, Pat, an individual contributor, and Carol, an individual contributor, if message policies for Joe are set such that Joe can receive email between 10 and 11 for messages from managers, and between 11 and 12 for messages from individual contributors, according to embodiments of the present invention, an arbitration module may override the user Joe's message profile specification, where Joe may specify that he wants to (1) receive as early as possible, based on one recipients qualification, (2) receive as late as possible, based on one recipient's qualification, or (3) receive only when time window supports all the recipients, etc. Rules in an arbitration module may be applied and a decision may be made that differs from what the sender of the message may have been notified. Thus, a return receipt notification may be generated and sent to the sender alerting the sender when the message or electronic mail was actually received by the recipient.

Thus, according to embodiments of the present invention, a user may set message policies or profiles that regulate when, who, and where messages may be received by the user. The message policies may designate that messages are received or not received based on a title of a person sending a message, a position of a person sending the message, a geographic location of the person sending the message, a geographic location of the user/recipient of the message, or any other type of preferences desired by a user. Message/mail reception processing may have access to corporate directories helping to identify titles, emails, location, etc. of senders of messages to a user. Further, message handling may have access to one or more other servers or other resources allowing access to information regarding the sender, recipient, locations, etc. in order to make determinations on whether a message will be received or not. Further, conflicts in rules regarding receipt of messages may be resolved based on a hierarchy set by a user or based on other preferences.

In addition, embodiments according to the present invention allow the suspension of the message policies, as well as, total blocking of reception of messages. Therefore, rather than revise message profile settings, a user may elect to suspend receipt of all messages for a time period. Similarly, a user may desire to disable reception of all messages until enabled. Once disabled, no messages may be received by the user and the sender is notified accordingly. The user may then enable reception of messages thus resuming message handling based on the message policies and rules set up by the user. If a user suspends or disables/blocks reception of messages, the message policies may be overwritten and not apply to incoming messages. In the case of suspension of messages, a sender of a message may be notified when the user/recipient may receive the message denoting when the suspension has ended. Further, notification may be sent to a sender letting the sender know when the message was actually received.

Moreover, according to embodiments of the present invention, knowledge of the system may be leveraged where an application may indicate a person or user's readiness status and this status used in the decision making based on the message policies of the user. For example, an application (e.g., IBM® LotusNotes® Sametime®) may allow a user/recipient to set a self imposed status of "do not disturb". When set, this status may be analyzed along with message policies for the user to determine how it may be factored into the collaborative decision making. For example, the "do not disturb" status may be respected or overridden depending on the message polices of the user. An application may also allow a user to set Out of Office notices, where the user is not likely to receive messages (e.g., email) because they are away. Message policy settings may help determine how this status is included in the decision making of whether the user receives messages.

Other factors can also be included in the decision making, next to the location and timeline criteria. For example, messages (e.g., emails) with content of a given size (message and/or attachments) may be considered next to an available time remaining in a current window for allowing message delivery. If an email, for example, is large and the allowable message delivery window is small, the email delivery may be suspended until a more suitable window for allowed message receipt and review occurs.

Moreover, according to embodiments of the present invention, those sending messages may elect to view a time range of settings that a recipient has elected, and the sender may select from that list when his message to the recipient will be sent. Therefore, the sender may designate when his message is received based on viewing the allowable reception window (s) set by the recipient.

According to embodiments of the present invention, location information may be accessed and obtained through other applications and used in decision making. For example, instant message location records, web conferencing schedule information, etc. may be accessed and used. References may be made to specific location specifications of conference room unique references (usually a name or number) or just work with generic references, i.e., work, home, office, conference room, etc. Caller ID, IP addresses used in the routing, meta data details, or other information may all be used to identify senders and their locations.

FIG. 1 shows a system for controlling preferences for messages according to an exemplary embodiment of the present invention. A system may include one or more servers 101, 102, one or more mail servers 103, one or more wireless devices 117-119, and one or more workstations 104-109, where the servers 102, 102, wireless devices 117-119, and workstations 104-109 may be interconnected via a network 110. The wireless devices 117-119 may access the network 110 via one or more access points 120-122 or by any other common method. The wireless devices 117-119 may be any type of wireless device such as, for example, a mobile phone, a personal digital assistant (PDA), a portable game system, a laptop computer, etc. The network 110 may be the Internet, an intranet, a local area network, a wide area network, or any other type of network. Each server 101, 102, 103 may include a network interface 111, a processor 112, a memory 113, and other elements normally associated with a server. Similarly, each workstation 104-109 may include a network interface 114, a processor 115, and memory 116, and other items normally associated with a workstation. The network interface 111, 114, may be configured to receive and send messages from the server 101, 102, 103 or workstation 104-109 to a recipient at a workstation or client device 104-109 via the network 110. The memory 113 (or storage device) may store message policies for one or more recipients. The processor 112, 115 may be configured to determine if a message sent from a sender to a recipient will be received by the recipient based on the message policies for the recipient and notify the sender that the message will not be received by the recipient and when it will be received responsive to the determination that the message will not be received by the recipient. The message policies may define one or more time periods when the recipient does not desire to receive messages and/or may define one or more current locations of the recipient where the recipient will only receive messages. The message policies may be set or configured by input received from a user or may be automatically configured based on defined rules. Further, the processor may also determine if a received message is of a type currently not being received by the recipient based on message policies for the recipient and notify a sender of the message that the message will not be currently received by the recipient and when it will be received responsive to the determination that the message is of a type currently not being received by the recipient. The type may be related to one or more locations of a sender from which the recipient does not desire to receive messages from, an email, a SMS message and an IM, and a job title of the sender, a group the sender belongs to, a company or organization the sender belongs to, a time frame, a date, a day of the week, etc.

Figure 2:
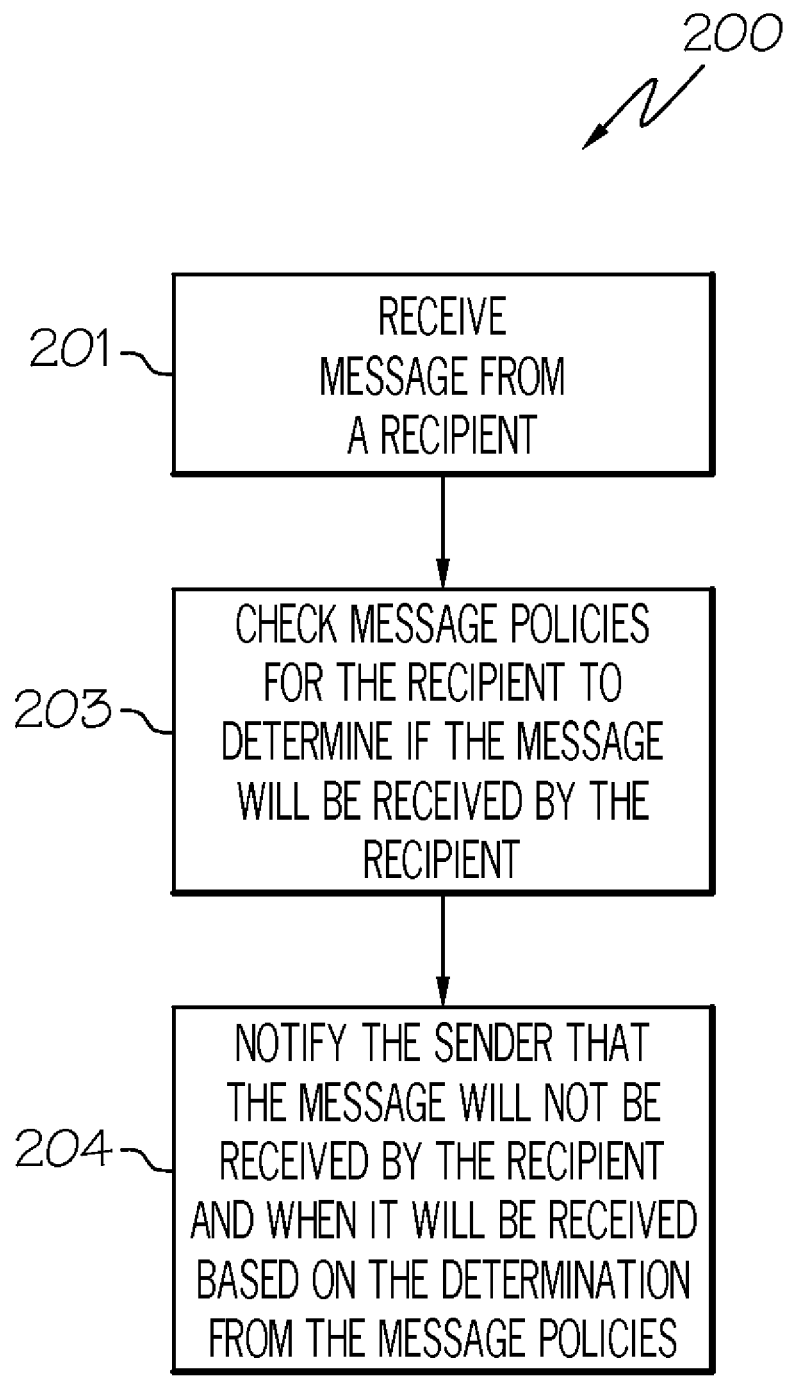
FIG. 2 is a flowchart of a process for controlling preferences for messages according to an exemplary embodiment of the present invention.

FIG. 2 shows a flowchart of a process for controlling preferences for messages according to an exemplary embodiment of the present invention. In the process 200, in block 201, a message may be received from a recipient. In block 203, message policies may be checked for the recipient to determine if the message will be received by the recipient. In block 204, the sender of the message may be notified that the message will not be received by the recipient and when it will be received based on the determination from the message policies.

Figure 3:
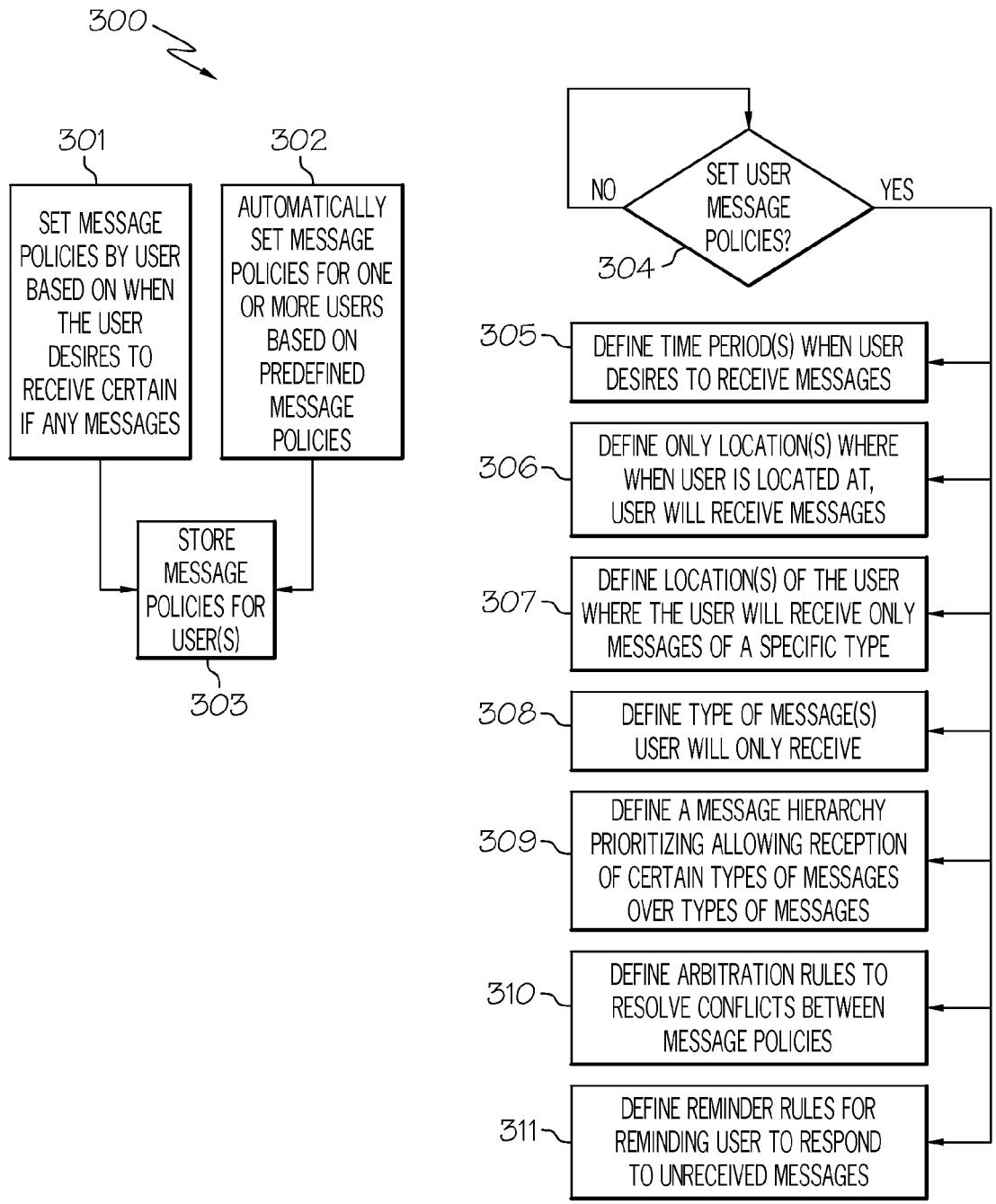
FIG. 3 is a flowchart of a process for controlling preferences according to another exemplary embodiment of the present invention.

FIG. 3 shows a flowchart of a process for controlling preferences according to another exemplary embodiment of the present invention. In the process 300, in block 301, message policies may be set by a user based on when the user desires to receive certain, if any, messages. Then in block 303, the message policies for the user may be stored. Alternatively, in block 302, message policies may be automatically set for one or more users based on predefined message policies. For example, a corporation or organization may define message receipt policies for users based on titles of employees, locations of employees, time of day, etc. Once set, then in block 303, the message policies may be stored for the users.

In block 304, it may be determined if it is desired to set user message policies and if not, the process ends. If it is desired to set user message policies, then any of many different types of rules and policies may be set regarding reception or allowing of reception of messages to the user. For example, in block 305, time periods may be defined for when the user desires to receive messages and/or not receive messages. Further, in block 306, location(s) where a user is currently located may be defined where the user will only receive messages when the user is at that location. In block 307, location of the user may be defined where the user will only receive messages of a specific type when the user is currently at that location. In block 308, a type of message that the user will only receive may be defined. Further, the user may set policies to receive one or more types of messages only during certain time periods or only when the user is in a certain location. In block 309, a message hierarchy may be defined where the hierarchy prioritizes allowing reception of certain types of messages over reception of other types of messages. Further, in block 310, arbitration rules may be defined to resolve conflicts between message policies when more than one message policy exists regarding the handling of receipt of a particular message. In these situations, the arbitration rules may resolve the conflict between the message policies to determine whether a message will be received or not received by a recipient or user. Conflicts may arise in situations where message policies exist for a corporation that apply to all employees of the corporation and where individual employees may also have their own specific message policies defined and set up. In block 311, reminder rules may be defined to remind a user to respond to non-received messages and/or unanswered messages. Further, reminder rules may be set out to remind a user/recipient that one or more messages have not been received.

Figures 4, 5:
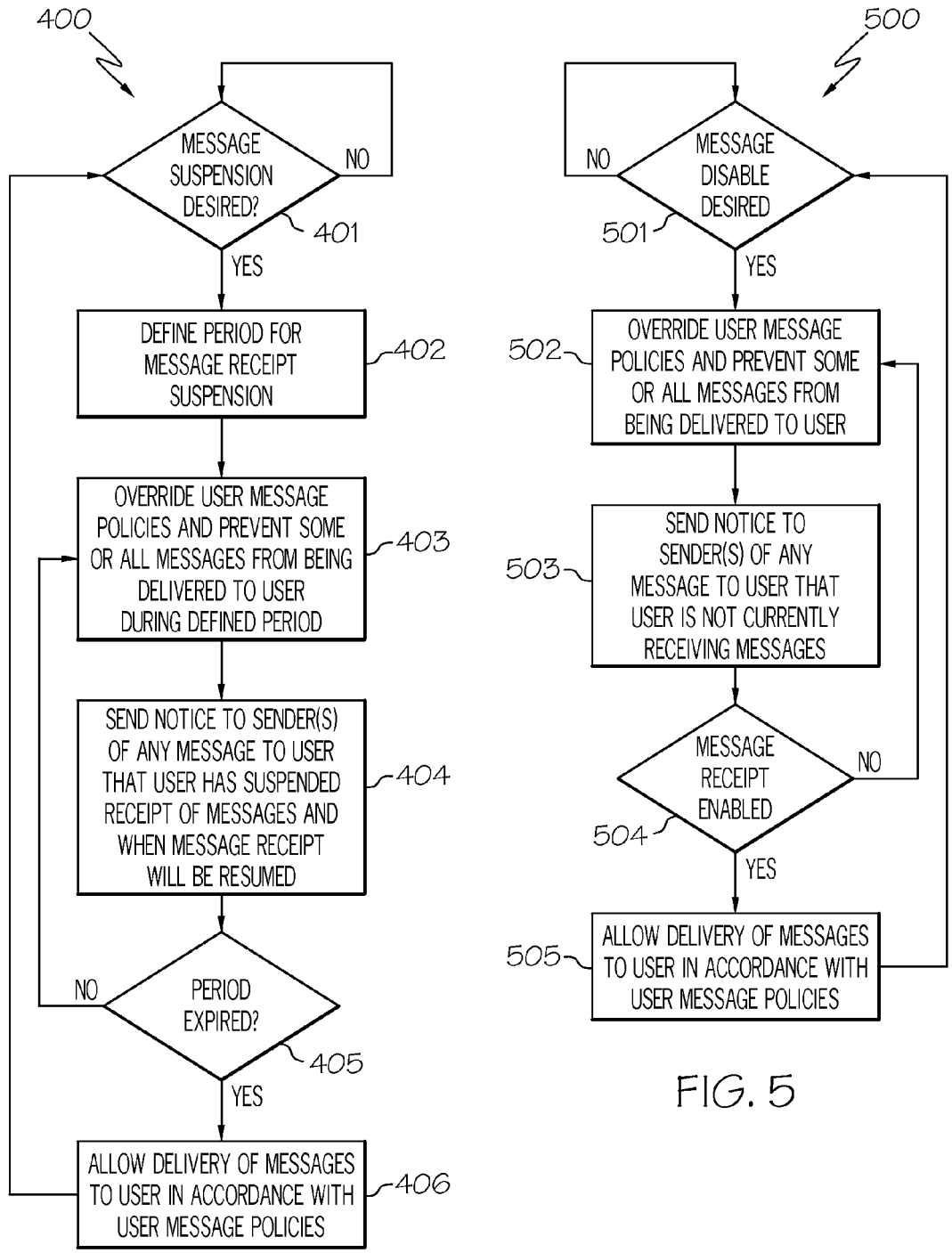
FIG. 4 is a flowchart of a process for controlling message suspension preferences according to an exemplary embodiment of the present invention.
FIG. 5 is a flowchart of a process for controlling message disabling preferences according to an exemplary embodiment of the present invention.

FIG. 4 shows a flowchart of a process for controlling message suspension preferences according to an exemplary embodiment of the present invention. In the process 400, in block 401, it may be determined if message suspension is desired and if not the process ends. Message suspension may be desired if the user/recipient desires to override the message policies for a short period of time and not receive any messages at all during the suspension. If message suspension is desired, then in block 402, a period may be defined for message receipt suspension. In block 403, user message policies may be overridden and some or all messages may be prevented from being delivered to the user during the defined suspension period. In block 404, a notice may be sent to senders of any messages to the user notifying the senders that the user has suspended receipt of messages and also notify the sender when message reception may be resumed. In block 405, it may be determined if the message suspension period has expired and if not, the process of overriding message policies for the user and preventing message policies from being delivered 403 and notifying senders accordingly 404 may be repeated. If the message suspension period has expired then in block 406, delivery of messages to the user may be allowed in accordance with the user defined message policies and the entire process repeated.

FIG. 5 shows a flowchart of a process for controlling message disabling preferences according to an exemplary embodiment of the present invention. In the process 500, in block 501, it may be determined if message reception is to be disabled and if not, the process ends. If it is desired to disable message reception, then in block 502, user message policies may be overridden and some or all messages prevented from being delivered to the user. Then in block 503, a notice may be sent to senders of any message to the user that the user is not currently receiving messages. In block 504, it may be determined if it is desired to enable message reception and if not, the process of overriding message policies and preventing message policies from being delivered in block 502 and notifying senders of messages to the user in block 503 may be repeated. If it is desired to enable message reception, then in block 505, delivery of messages to the user may be allowed in accordance with the user message policies and the entire process repeated.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention has other applications in other environments. This application is intended to cover any adaptations or variations of the present invention. The following claims are in no way intended to limit the scope of embodiments of the invention to the specific embodiments described herein.

What is claimed is:

1. A method, operable on a server, for controlling preferences for messages comprising:
   receiving, by the server, a message from a sender to a recipient;
   determining, by the server, if the message will be received by the recipient based on at least a first message policy of a plurality of message policies for the recipient;
   notifying, by the server, the sender that the message will not be received by the recipient and an estimated time of when it will be received responsive to the determination that the message will not be received by the recipient; and
   resolving, by the server, a conflict between the first message policy and a second message policy of the plurality of message policies such that the actual time the message is received is different from the estimated time of when the message will be received in the notification to the sender.

2. The method according to claim 1, further comprising configuring, by the server, the message policies in response to receiving input from the recipient or automatically based on set rules.

3. The method according to claim 1, wherein the message policies define at least one time period when the recipient does not desire to receive messages or define at least one current location of the recipient where the recipient will only receive messages.

4. The method according to claim 3, wherein the message policies define at least one current location of the recipient where the recipient will only receive messages of a specific type.

5. The method according to claim 1, further comprising determining, by the server, if the message is of a type currently not being received by the recipient based on message policies for the recipient and notifying the sender that the message will not be currently received by the recipient and when it will be received responsive to the determination that the message is of a type currently not being received by the recipient based on the message policies for the recipient.

6. The method according to claim 5, wherein the type comprises at least one of at least one location from which the recipient does not desire to receive messages from, at least one of an email, a short message service (SMS) message and an instant message (IM), and at least one job title of the sender.

7. The method according to claim 1, further comprising a decision making hierarchy being specified to resolve the conflict between rules of the first message policy and the second message policy.

8. The method according to claim 1, further comprising reminding, by the server, the recipient to respond to the message.

9. The method according to claim 1, further comprising one of suspending, by the server, receipt of all messages for a set period and disabling, by the server, receipt of all messages until enabled, the suspending and the disabling overriding the message policies for the recipient.

10. The method according to claim 1, further comprising providing to the sender, by the server, information regarding at least one period when the recipient will receive messages, the sender being allowed to select one of the at least one period for sending a message to the recipient.

11. A computing device for controlling preferences for messages comprising:
   a network interface, the network interface being configured to receive and send messages;

a storage device, the storage device containing a plurality of message policies for a recipient comprising a first message policy and a second message policy; and a processor, the processor configured to determine if a message sent from a sender to a recipient will be received by the recipient based on at least the first message policy of the plurality of message policies for the recipient and notify the sender that the message will not be received by the recipient and an estimated time of when it will be received responsive to the determination that the message will not be received by the recipient and resolve a conflict between the first message policy and the second message policy of the plurality of message policies such that the actual time the message is received is different from the estimated time of when the message will be received in the notification to the sender.

12. The computing device according to claim 11, wherein the computing device comprises one of a server and a client device of the recipient.

13. The computing device according to claim 11, wherein the message policies at least one of define at least one time period when the recipient does not desire to receive messages and define at least one current location of the recipient where the recipient will only receive messages.

14. The computing device according to claim 11, wherein the message policies are configured at least one of responsive to receiving input from the recipient and automatically based on set rules.

15. The computing device according to claim 11, further comprising the processor determining if the message is of a type currently not being received by the recipient based on message policies for the recipient and notifying the sender that the message will not be currently received by the recipient and when it will be received responsive to the determination that the message is of a type currently not being received by the recipient.

* * * * *